US012092277B2

(12) United States Patent
Hoersch

(10) Patent No.: US 12,092,277 B2
(45) Date of Patent: Sep. 17, 2024

(54) SET OF LIGHTING COMPONENTS WITH A CONNECTION SYSTEM AND LIGHTING DEVICE FOR THE SET

(71) Applicant: ROXX GmbH, Cologne (DE)

(72) Inventor: Marco Hoersch, Hamburg (DE)

(73) Assignee: ROXX GMBH, Cologne (DE)

( * ) Notice: Subject to any disclaimer, the term of this patent is extended or adjusted under 35 U.S.C. 154(b) by 0 days.

(21) Appl. No.: 18/219,207

(22) Filed: Jul. 7, 2023

(65) Prior Publication Data

US 2024/0019089 A1 Jan. 18, 2024

(30) Foreign Application Priority Data

Jul. 12, 2022 (DE) ..................... 10 2022 117 390.9
Feb. 9, 2023 (DE) ..................... 10 2023 103 124.4

(51) Int. Cl.

| | |
|---|---|
| ***F21S 2/00*** | (2016.01) |
| ***F21V 5/04*** | (2006.01) |
| ***F21V 21/08*** | (2006.01) |
| ***F21V 21/096*** | (2006.01) |
| ***F21W 131/406*** | (2006.01) |
| ***F21Y 113/10*** | (2016.01) |
| ***F21Y 115/10*** | (2016.01) |

(52) U.S. Cl.

CPC .............. *F21S 2/005* (2013.01); *F21V 5/048* (2013.01); *F21V 21/0832* (2013.01); *F21V 21/096* (2013.01); *F21W 2131/406* (2013.01); *F21Y 2113/10* (2016.08); *F21Y 2115/10* (2016.08)

(58) Field of Classification Search

CPC .... F21V 21/0832; F21V 21/096; F21V 5/048; F21S 2/005

See application file for complete search history.

(56) References Cited

U.S. PATENT DOCUMENTS 6,314,669 B1 * 11/2001 Tucker .................. G09F 9/3026 345/82
8,197,088 B2 * 6/2012 Patterson .............. G06F 3/1446 362/249.02
8,616,757 B2 * 12/2013 Leadford .................. F21S 4/28 362/648
9,046,232 B2 * 6/2015 Melzner .................. F21V 29/75

(Continued)

FOREIGN PATENT DOCUMENTS

CN 000209856956 12/2019
CN 216 591 171 5/2022

(Continued)

*Primary Examiner* — Arman B Fallahkhair
(74) *Attorney, Agent, or Firm* — Cozen O'Connor

(57) ABSTRACT

A set (100) of lighting components includes a first lighting component (10) having a first connecting surface (40) of the first lighting component and a second lighting component (11) having a first connecting surface (42) of the second lighting component. A first connecting element (54) of a connecting mechanism is provided on the first connecting surface (40) of the first lighting component, and a second connecting element (52) of a connecting mechanism is provided on the first connecting surface (42) of the second lighting component. The second connecting element is complementary to the first connecting element, so that the first lighting component (10) can be detachably connected to the second lighting component (11).

16 Claims, 13 Drawing Sheets

(56) References Cited

U.S. PATENT DOCUMENTS

| | | | | |
|---|---|---|---|---|
| 9,080,912 | B2 * | 7/2015 | Patterson | F21V 21/088 |
| 9,612,004 | B2 * | 4/2017 | Hemiller | H05K 7/14 |
| 9,644,823 | B2 * | 5/2017 | Hemiller | F21V 21/34 |
| 9,976,586 | B2 * | 5/2018 | Morimoto | F16B 12/00 |
| 10,197,224 | B1 | 2/2019 | Macias | |
| 10,393,329 | B2 * | 8/2019 | Germain | F21V 21/005 |
| 10,876,290 | B2 * | 12/2020 | Patterson | F21V 21/008 |
| 11,231,061 | B2 * | 1/2022 | Morimoto | H01R 13/20 |
| 11,349,270 | B2 * | 5/2022 | Zhou | H01R 13/62 |
| 2016/0305631 | A1 | 10/2016 | Hansen et al. | |

FOREIGN PATENT DOCUMENTS

| | | | |
|---|---|---|---|
| CN | 216844220 | U | 6/2022 |
| DE | 10139336 | | 2/2003 |
| DE | 2020 170 050 50 | | 11/2017 |
| DE | 202017005050 | U1 | 11/2017 |
| EP | 3081853 | B1 | 12/2018 |
| KR | 20200002489 | U | 11/2020 |
| WO | WO 2017/044449 | | 3/2017 |

* cited by examiner

SET OF LIGHTING COMPONENTS WITH A CONNECTION SYSTEM AND LIGHTING DEVICE FOR THE SET

BACKGROUND OF THE INVENTION

1. Field of the Invention

The invention relates to a set of lighting components with a connection system for lighting components, such as used in particular in event lighting technology, which can be grouped into a cluster by the connection system. Furthermore, the invention relates to a lighting device suitable therefor, which can achieve stroboscope-like lighting effects.

2. Description of the Related Art

For the illumination of events, such as theatres, stage shows or other events, professional lighting technology is often used to create a lighting composition for the room to be illuminated, often in accordance with a stage show changing and matching to the stage show. For this purpose, various lighting components are arranged at suitable points in the room and correspondingly controlled as required. Used lighting components are for example spotlights, floodlights, blinders, strobes, area lights and the like, also in various combinations.

By means of the arrangement of several, possibly different lighting effects, on the one hand the room can be illuminated in desired color tones and brightness, also variable in time, and on the other hand targeted, e.g. short-term, light effects can be set. Thus, at suitable times, in addition to the light composition appearing, for example, in darker colors, targeted dazzling/glare effects can be set by means of one or more blinders and/or bright and fast flashes can be generated by means of stroboscopes, and thus the attention of the audience can be directed by the lighting effects to a particular scene or a partial area of the room, etc.

The lighting components themselves can have a suitable construction depending on the requirements, e.g. they can be equipped with LEDs in matrix or row form, use halogen lamps, be constructed in PAR design, etc. In particular, stroboscopes with a central flash tube are often used for this purpose. A stroboscope emits light flashes at specific, often regular intervals. The flash duration is less than 5 ms, the frequency of the flashes is for example between 0.5 and 100 Hz. Such stroboscope-like lighting devices, traditionally provided by means of Xenon flash lamps, are also imitated by the use of LEDs (light-emitting diodes), in that the LEDs emit white light.

It is further known to combine stroboscope lighting devices with colored lighting means. An example of a lighting device that can be varied in a light spectrum and thus can be used for colored stage illumination and as a stroboscope at the same time is described in DE 2020 170 050 50 U1. However, the lighting device described there cannot be used flexibly, in particular for creating large-area lighting patterns or images.

In general, the various lighting components are usually installed separately from each other in the room, e.g. on suitable fixtures, usually requiring one fixture per lighting component. However, it is often desirable, for practical or aesthetic reasons or for creating large-scale lighting patterns or lighting images, to arrange several identical or different lighting components together so that they form a unit. Especially, when the lighting components are used for mobile applications, it is advantageous if they can be flexibly grouped and separated again as required, depending on the intended purpose.

SUMMARY OF THE INVENTION

It is an object of the invention to provide a set of lighting components with a connection system which allows flexible and easy grouping of lighting components into a unit. Furthermore, the connection system shall be such that a modification of the groupings as required is possible without great effort. It is further an object of the invention to provide a lighting device which is suitable for providing large area lighting patterns or lighting images by combination with other lighting devices and which can also be used for stroboscopic effects as required.

DISCLOSURE OF THE INVENTION

This object is solved with a set of lighting components with a connection system between the lighting components according to the features of claim 1. A lighting device according to the invention is defined in claim 11. Preferred embodiments are given in the dependent claims.

The invention is based on the idea of providing a part of a connecting mechanism on each lighting component itself of the set of lighting components, so that the lighting components of the set can be directly connected to each other, without interposing a fixture or the like. In this way, an arrangement of lighting components (cluster) can be provided which in themselves have a uniform overall appearance. Preferably, the lighting components are adapted to each other in their shape, e.g. in that all lighting components are block shaped or cuboid and their side surfaces, to which they can be connected, i.e. which form the connecting surfaces to an adjacent lighting component, are each an integral multiple of each other in their dimensions, in particular length and/or width.

In particular, a set of lighting components includes a first lighting component having a first connecting surface of the first lighting component and a second lighting component having a first connecting surface of the second lighting component. A first connecting member of a connecting mechanism is provided on the first connecting surface of the first lighting component, and a second connecting member of a connecting mechanism is provided on the first connecting surface of the second lighting component. The second connecting element of a connecting mechanism is complementary to the first connecting element of the connecting mechanism, so that the first lighting component can be detachably connected to the second lighting component by detachably connecting the first connecting element to the second connecting element. By further providing a guiding and positioning mechanism in addition to the actual connecting mechanism that firmly connects and locks lighting components to each other, the lighting components to be connected to each other can be pre-positioned and pre-connected to each other. Such pre-positioning and pre-connecting not only allows the lighting components to be aligned with each other in their mounting position and thus the mounting can be done more easily, e.g. also in unfavorable positions or positions, but also that the pre-connection, if chosen appropriately, e.g. by means of sufficiently strong magnets, ensures that the lighting components hold their position during the mounting, e.g. also against gravity, in case of overhead mounting.

The first lighting component and the second lighting component each additionally have an element of a guiding and positioning mechanism on their connecting surface for pre-positioning and pre-connecting the first and second lighting components. For example, the element of the guiding and positioning mechanism of the first lighting component may be a first magnetic element (south pole) and the element of the guiding and positioning mechanism of the second lighting component may be a second magnetic element (north pole) attractable thereto. If, for example, the second lighting component is to be attached to the first lighting component from below, the guiding and positioning mechanism can be used, e.g. if sufficiently strong magnetic elements are selected, to make a pre-attachment before the lighting components are locked together by means of the connecting mechanism. Preferably, the pre-connection is so reliable and strong that during assembly and disassembly the lighting components are held together without further fastening means, at least temporarily.

The number of lighting components in a set is not limited to the number of two. Rather, the set can have any number of lighting components of the same or different types.

Providing each of the first and second connecting elements on a connecting surface also includes arrangements in which the connecting elements are not directly attached to the surface itself, which may be formed by a non-load bearing housing cover, for example. Rather, this includes arrangements in which the connecting elements are attached to the lighting component itself in close proximity to these connecting surfaces. For example, one of the connecting elements may be recessed into the interior of the housing of the lighting component relative to a connecting surface formed by a housing cover, and the other of the connecting elements may protrude or at least be placed in a projecting position relative to the connecting surface.

Complementary connection elements between the first and second connection elements include any connection solution, for example force-locking (frictional locking) and/or interlocking (positive locking), in which a first element of a connecting mechanism can be engaged with a second element of a connecting mechanism to connect the two elements together.

According to a preferred embodiment, the first connecting surface of the first lighting component and the first connecting surface of the second lighting component are complementarily shaped. For example, the connecting surfaces can both be shaped as a plane, in particular the side surface of a cuboid, or one of the connecting surfaces is concave and the other is correspondingly convexly curved thereto. This enables a uniform, harmonious appearance when several lighting components are arranged as a group or cluster.

Preferably, one or more lighting components of the set are provided with a plurality of connecting surfaces, and further preferably, the different connecting surfaces comprise partially the first element of the connecting mechanism and partially the second element of the connecting mechanism.

In particular, in the set, the first lighting component further comprises, in addition to the first connecting surface with the first element of the connecting mechanism, a second connecting surface on which a second element of a connecting mechanism is provided. This allows a quasi-infinite continuation of the grouping of multiple or a plurality of lighting components, particularly when the connecting surfaces are each consistent, i.e., appropriately shaped and sized, i.e., either shaped the same size or in integer multiples.

When arranging several connecting surfaces on a lighting component and corresponding connecting elements, it is particularly preferred if the second connecting surface of the first lighting component is located opposite the first connecting surface of the first lighting component, in particular if the lighting component itself is shaped as a cuboid. If then opposite surfaces, i.e. opposite side surfaces of the cuboid are used as connecting surfaces with the corresponding connecting elements, a group with a uniform appearance can be created by any combination and arrangement of different lighting components, which can be set up together as a group or attached to a suspension.

Alternatively or additionally, the second lighting component in particular further comprises a second connecting surface at which a first element of a connecting mechanism is provided. Preferably, the second connecting surface of the second lighting component is located opposite the first connecting surface of the second lighting component.

To further increase the flexibility in arranging the lighting components of the set against each other, it is particularly preferred if both a first element of a connecting mechanism and a second element of a connecting mechanism are provided on the first connection surface and/or on the second connection surface. In this way, the connection surface with the corresponding connection element can be flexibly used as required by selecting the first or the second connection element as required.

In a particularly preferred embodiment, the first lighting component and the second lighting component are cuboid-shaped and a first connecting element and/or a second connecting element is provided on all four side surfaces of at least one of the first or second lighting components, respectively. This also provides very flexible possibilities in terms of combination options for arranging multiple lighting components.

With regard to the connecting mechanism, it is preferred if one of the first and second connection elements is provided as a member protruding from the connection surface and having a shape that can form a positive lock with the shape of the other of the first and second connection elements, wherein said connection element being recessed with respect to the connection surface. E.g., said connecting element may be housed inside a housing and may be accessible through an opening in the connecting surface, so that the protruding connecting element, when placed in a position protruding from the connecting surface, may be engaged with the second connecting element inside the housing. For example, the first connecting element is provided as a hook element and the second connecting element is provided as a bolt element, or vice versa.

In this case, for example, the hook element can be brought into the position protruding from the connection surface by means of a rotating mechanism, i.e. the user operates a handle element for rotation and thereby rotates the connection element out of the housing of the lighting component into the position protruding from the connection surface, in which it can lock or engage with the other connection element on the other lighting component when the latter is set back, for example, relative to the housing of the other lighting component.

The first and/or the second lighting component of the set or the several lighting components of the set can each be a blinder, a spotlight, a floodlight, a stroboscope, an area light, an area spotlight or a couplable loudspeaker. Several identical lighting components or different lighting components can form a set as require.

Particularly preferred as a lighting component is a lighting device which can be used simultaneously as stroboscopic illumination and as area illumination, in particular in combination with several similar such lighting devices. Such a lighting device comprises a plurality of first lighting elements adapted to emit light in a fixed first light spectrum and a plurality of second lighting elements adapted to emit light in a variable light spectrum, wherein the first lighting elements and the second lighting elements are arranged in at least two rows of first lighting elements and at least two rows of second lighting elements, respectively, wherein at least a part of the rows of first lighting elements is arranged as a single row.

Thus a lighting device is provided, which can be used on the one hand for stroboscope effects for e.g. stage lighting and on the other hand also for colored lighting effects, wherein the lighting device is designed for both stroboscope effects and color lighting in such a way that different lighting patterns can be generated both in the context of the individual lighting device and by combination of several lighting devices to a set. In particular, the lighting device is characterized by the fact that those lighting elements which generate stroboscope effects are not only provided as a strip in a central area of the lighting device as in the case of a classical stroboscope, but rather are arranged in a special distribution on the surface of the lighting device.

In such a lighting device, the lighting elements are generally arranged in rows on a substantially two-dimensional surface at regular intervals from one another at least in one direction of the surface. That is, both the first and second lighting elements are arranged in respective rows of first lighting elements and rows of second lighting elements. In the direction perpendicular to these rows, the lighting components may also be arranged at the same distances as the lighting elements of a single row from each other, or larger distances may be provided between adjacent rows. Within a row, either first lighting elements or second lighting elements are provided and the lighting elements are not mixed. By this arrangement of the first and the second lighting elements, in addition to at least two line-shaped or strip-shaped stroboscope-like light effects, a colored illumination can also be generated by means of the second lighting elements, to which no fixed light spectrum is assigned.

That the first lighting elements are arranged in a single row of first lighting elements means that the arrangement is interrupted in the direction perpendicular to the direction of the row by rows of second lighting elements and/or that two rows of first lighting elements are spaced apart from each other to such an extent that when lighted the row appears as a single line and does not merge with an adjacent row. For example, the distance between two rows is chosen to be greater than the distance between two lighting elements of a row, or a row is omitted. On the other hand, in addition to the row or rows of first lighting elements arranged as a single row, a block of multiple rows of first lighting elements may be formed to achieve the effect of a wider strip of illumination. The first and second lighting elements may all be arranged on a common panel, or a plurality of panels may be provided, each carrying first lighting elements or second lighting elements or combinations of first and second lighting elements.

Providing at least four rows of lighting elements, namely at least two rows of first lighting elements and two rows of second lighting elements, results in a high flexibility for achieving different lighting effects, i.e. any combination of lighting elements can be controlled simultaneously or sequentially and thus different light patterns can be achieved.

According to a preferred embodiment, the fixed first light spectrum of the first lighting component is white, preferably cold-white. This serves to achieve a stroboscope effect by means of the first lighting elements. If several rows of first lighting elements with a white light spectrum are provided immediately adjacent to each other in an area of the lighting device, when they are driven together for illumination, they achieve a striped or tubular effect that can be perceived as a stroboscope effect if the duration of operation is short enough, e.g. below 5 ms, so that the lighting up in white or cold-white is perceived as a white flash. By using white lighting elements, the energy density required for stroboscopic effects can be achieved (in contrast to lighting elements that are variable in their spectrum, which can also produce white light, among other things). Furthermore, the classic stroboscope effect is achieved with white light. Preferably, the variable light spectrum of the second lighting elements is an RGB light spectrum. Preferably, the lighting elements can be varied in the emitted color, i.e. the emitted light, depending on their control, and thus various lighting effects can be achieved.

According to a preferred embodiment, the first and second lighting elements are each LEDs. This allows the arrangement of all lighting elements on a common panel, if desired. In addition, the use of LEDs makes sense from a thermal point of view and with regard to energy consumption, since they emit little heat at relatively high light energy and low power consumption.

Preferably, the rows of first lighting elements arranged as a single row are each covered with an elliptical lens. This imitates the appearance of the illumination of conventional, traditional Xenon bulbs.

Preferably, at least three rows of first lighting components are provided, and a portion of the rows of first lighting elements is grouped into a group of first lighting elements having at least two immediately adjacent rows of first lighting components. For example, if three rows of first lighting elements are provided, a group of two rows of first lighting elements is provided in addition to the one row of first lighting elements arranged as a single row. Such grouped rows of first lighting elements can be provided in a particularly preferred manner as a single unit, controllable together, e.g. by being arranged on a single, common carrier.

Preferably, several individual rows of first lighting elements are provided. In particular, if these individual rows are arranged symmetrically to an axis of symmetry of the lighting device extending in the direction of the rows, have equal distances to each other, and further, in particular to the edge of the lighting device, the outermost of the individual rows each have half of this distance, a variety of patterns, symbols, graphics, etc. can be displayed by combinations of several lighting devices and controls of the rows of first lighting elements or of partial areas of these rows.

Further preferably, this group of rows of first lighting elements or one of the groups of rows of first lighting elements is arranged in a central area of the lighting device, in a direction perpendicular to the rows. Thus, a stroboscopic effect can be achieved particularly well with the central group of rows of first lighting elements when driven together, since these lighting elements merge into a strip. If this group is provided centrally on the lighting device, a combination of several lighting devices next to each other in the direction of the rows can imitate a continuous stroboscope line over several lighting devices, which also merge into an overall structure. By combining several lighting devices side by side in the direction perpendicular to the rows, the central position of the group on each of the illumination devices can, for example, create a uniform stripe pattern.

In a particularly preferred example, a central group of five rows of first lighting elements is provided. These rows of the central group of first lighting elements can be provided in a particularly preferred manner on a single, common LED carrier and jointly controllable. Such a grouping of several rows of first lighting elements has the advantage and the effect that a relatively high output power can be achieved on a very compact area. Thus, a high luminosity and brightness can be achieved. Adjacent to this group in the direction perpendicular to the rows, a single row of first lighting elements, a group of five rows of second lighting elements and a further single row of first lighting elements are provided on each side, axisymmetric to an axis of symmetry extending along the central row. This means that a large number of patterns, graphics, etc. can be produced both with a single lighting device and with a combination of several lighting devices.

If rows of first lighting elements are arranged as a group, they are preferably covered with a common elliptical lens so that the effect of a Xenon tube is achieved and imitated.

Preferably, the lighting elements of the group of first lighting elements and/or the lighting elements of the individual rows of first lighting elements are grouped in the direction along the longitudinal direction of the rows into several segments that can be controlled separately from each other. It is particularly preferred if at least the individual rows of first lighting elements are provided as in several separately controllable segments, e.g. 12 segments. For example, 6 or 12 separately controllable segments can be provided along a row. This further increases flexibility and the ability to display a variety of patterns, shapes and graphics.

Preferably, at least some of the rows of second lighting elements are grouped into a group of second lighting elements with at least two directly adjacent rows of second lighting elements. Thus, different color patterns can be achieved.

Preferably, the lighting elements of the group of second lighting elements are grouped in the direction along the longitudinal direction of the rows into several separately controllable segments. For example, 6 or 12 separately controllable segments can be provided along a row. This further increases flexibility and the ability to display a variety of patterns, shapes and graphics.

Preferably, the lighting device further comprises a controller device for controlling the lighting elements or the groups or segments of lighting elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is described by way of example with reference to the attached figures, in which.

DETAILED DESCRIPTION OF THE DISCLOSED EMBODIMENTS

FIGS. 1 to 7 each show different embodiments of a set 100 of lighting components according to the present invention, the lighting components 10, 11, 12, 20, 21, 22 each being shown in the assembled state.

Figure 1:
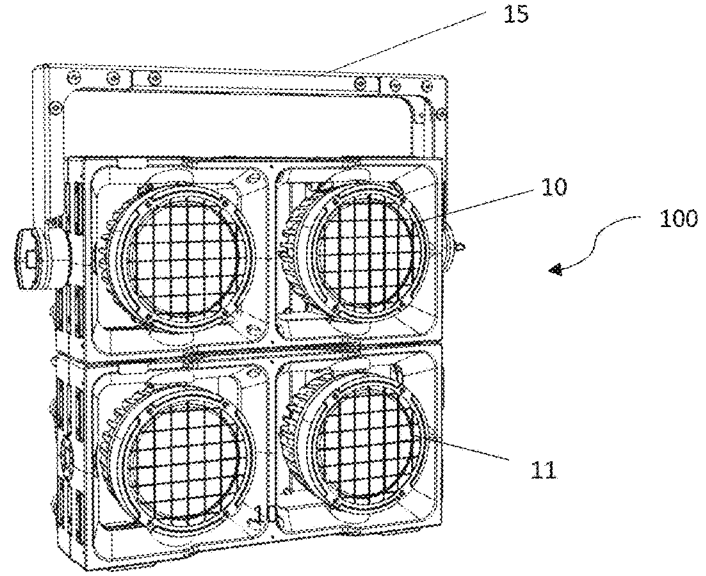
FIG. 1 shows a set of lighting components according to a first embodiment.

FIG. 1 shows a set 100 comprising a first blinder 10 and a second blinder 11, each of which is designed as a so-called two-group blinder, i.e. each has 2 groups of light sources, e.g. LEDs. Each of the blinders 10, 11 is substantially cuboidal in shape, i.e. in plan view of the light emitting side, each of the blinders 10, 11 has an substantially rectangular base area. The width of each blinder 10, 11 (left-right direction in FIG. 1) is twice as large as their height (up-down direction in FIG. 1). Further, in the embodiment shown in FIG. 1, each blinder 10, 11 has the two light source groups arranged side by side, i.e. horizontally in FIG. 1. The first blinder 10 and the second blinder 11 forming a first lighting component and a second lighting component, respectively, are arranged vertically one above the other according to the embodiment shown in FIG. 1, being stacked and connected to each other at the longer side surface of their cuboidal shaped housings. Further, a common bracket 15, which serves as a handle, a mounting bracket or a retaining bracket, is provided on one of the blinders 10, 11.

The set 100 of lighting components shown in FIGS. 2 and 3 differs from that shown in FIG. 1 in that three blinders 10, 11, 12, each of identical configuration and corresponding to the blinders 10, 11 shown in FIG. 1, are interconnected and arranged in a cluster by being stacked on top of each other along their respective longitudinal side surfaces of their cuboidal shaped housings and connected to each other by a connecting mechanism described in more detail with reference to FIGS. 8 to 16. Also, the set 100 additionally includes a mounting or retaining bracket 15 shown in FIG. 2 in the mounted state, and in FIG. 3 in a state detached from the set.

Figure 2:
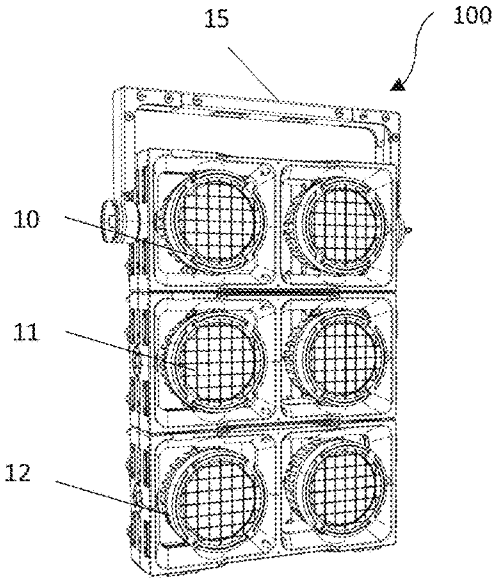
FIG. 2 shows a set of lighting components according to a further embodiment.
Figure 3:
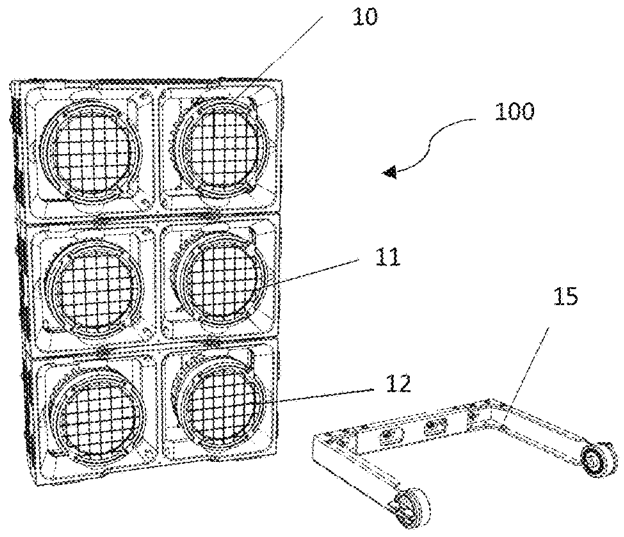
FIG. 3 shows the set from FIG. 2 with released mounting or handle bracket.
Figure 4:
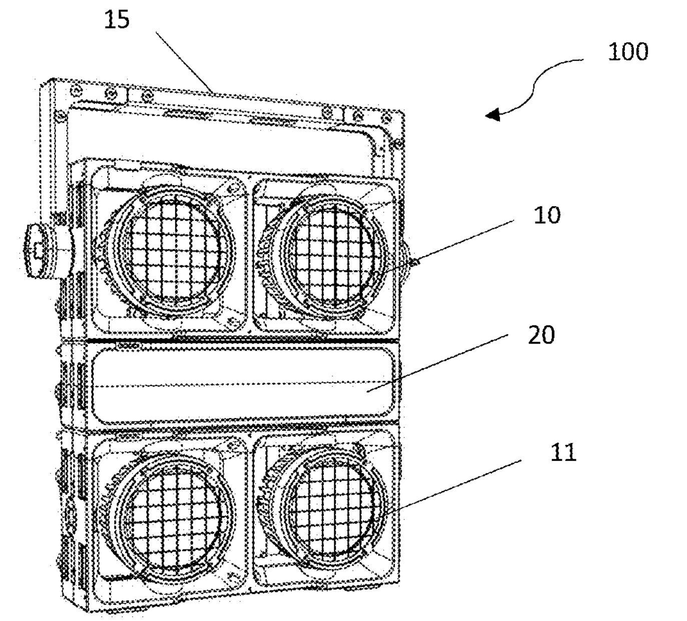
FIG. 4 shows a set of lighting components according to a further embodiment.

In the set 100 of FIG. 4, two blinders 10, 11 are provided which correspond to the blinders 10, 11 of FIGS. 1 to 3. Between the blinders 10, 11, a further, third lighting component is provided in the form of a floodlight (area spot light) 20 which can be coupled to the blinders 10, 11 or to the lighting effects generated by them. The floodlight 20, which can thus be coupled to the same lighting and possibly sound system as the blinders 10, 11, is also cuboidal, although its dimension in the height direction (substantial in the up-down direction in FIG. 4) is only half of the blinders 10, 11 (or the height of the blinders 10, 11 is twice that of the floodlight 20). The width (left-right direction in FIG. 4) and the depth of the blinders 10, 11 as well as of the floodlight 20 are the same in each case. Thus, in the set and arrangement shown in FIG. 4, different lighting components are stacked and attached to each other by a connecting mechanism (described in more detail later). In addition, a mounting or retaining bracket 15 is attached to one of the blinders. The bracket 15 may also serve as a handle bracket.

Figure 5:
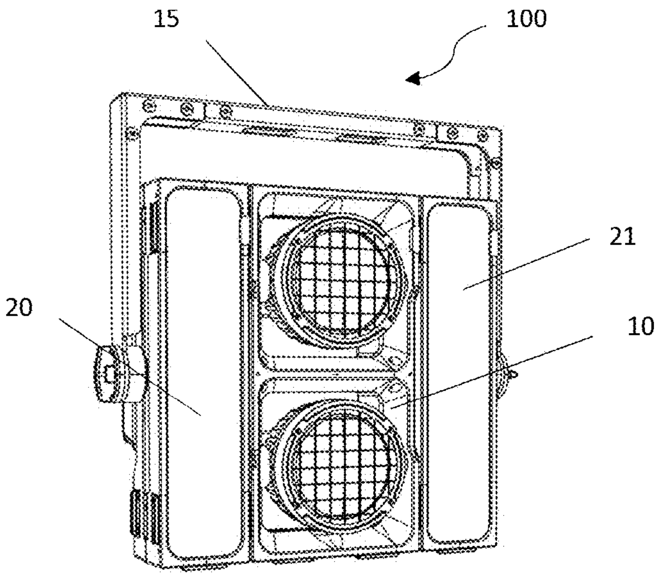
FIG. 5 shows a set of lighting components according to a further embodiment.

FIG. 5 shows a set 100 of lighting components, whereby two floodlights 20, 21 and a blinder 10 are provided. The shape and dimensions of the floodlights 20, 21 and the blinder 10 correspond to those of the previously described embodiments. In the embodiment shown in FIG. 5, the blinder 10 is oriented vertically, i.e. its longitudinal direction is in the top-down direction in the state of use shown in FIG. 5. To the left and right of the blinder 10, a floodlight (area spotlight) 20, 21 is connected respectively via the long side surfaces of the cuboids which form the connecting surfaces. Furthermore, a mounting or holding bracket 15 is provided with a bracket end on each of the floodlight 20, 21 and is attached to the arrangement.

Figure 6:
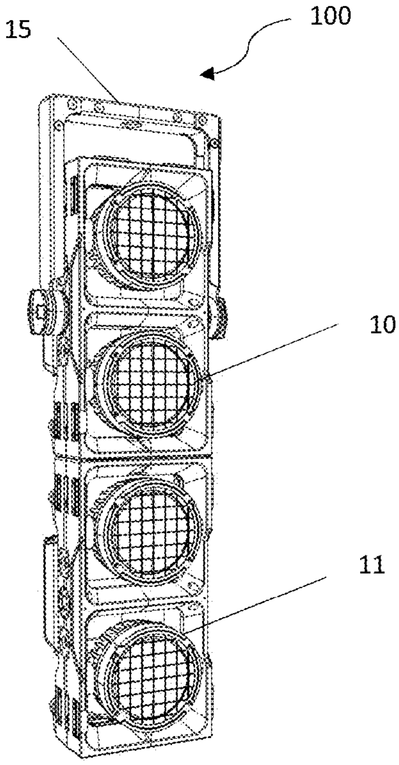
FIG. 6 shows a set of lighting components according to a further embodiment.

The embodiment shown in FIG. 6 consists of two blinders 10, 11 of the same construction type as that of the previously described embodiments, whereby one of the blinders 10, 11 has a bracket (as a handle bracket, mounting bracket and/or retaining bracket) 15 attached to it. Unlike, for example, the embodiment shown in FIG. 1, which also consists of two blinders 10, 11, in this case the blinders 10, 11 are combined along their short side surfaces as connecting surfaces. This is made possible by the fact that, in the case of the blinders 10, 11 as lighting components, a connecting mechanism 50, which is described in more detail below, is provided on each of the side faces of the cuboid.

Figure 7:
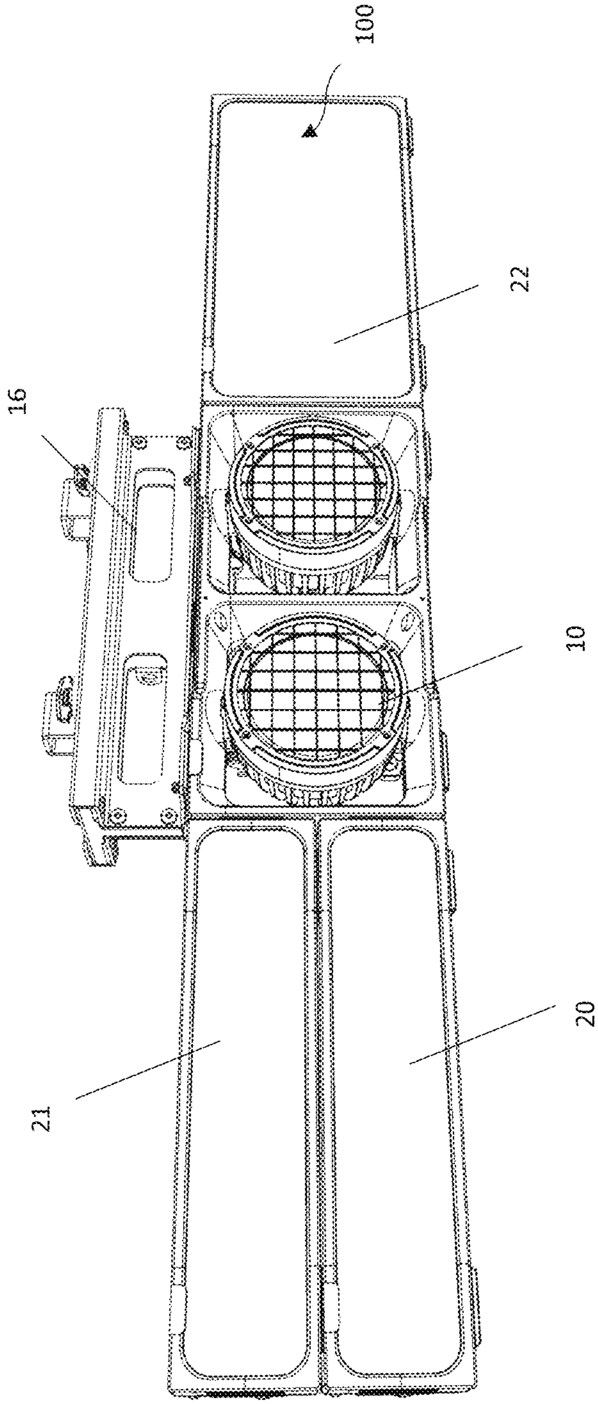
FIG. 7 shows a set of lighting components according to a further embodiment.

Finally, FIG. 7 shows an arrangement of a blinder 10 (same configuration as in the previously described embodiments) and three floodlights (area spotlights) 20, 21, 22. The floodlights 20, 21 correspond to the floodlights (area spotlights) 20, 21 described with respect to the embodiment shown in FIG. 5, the floodlight (area spotlight) 22 corresponds in size to the dimensions of the blinder 10, i.e. it is twice as long in its height direction as the floodlights 20, 21. In the set 100 of FIG. 7, the blinder 10 is arranged centrally in the transverse direction and laterally adjacent, i.e. via its smaller side surfaces as connecting surfaces, the floodlight 22 is arranged and connected on one side and the floodlights 20, 21 are arranged and connected on the other side with their small side surfaces as connecting surfaces. Furthermore, via the connecting mechanism 50 provided on the longer side surface of the blinder 10 (not shown in FIG. 7), a sledge 16 is attached to the blinder which can be used, for example, to guide the set 100 in a rail attached to a ceiling of a room.

The lighting components described with respect to FIGS. 1 to 7, namely the blinders 10, 11, 12 and the floodlights 20, 21, 22, are to be understood as exemplary in terms of their functionality. Thus, in addition to blinders and floodlights (area spotlights), other lighting components can also be used, such as strobes, spotlights, light bands, etc. Additional elements, such as loudspeakers, are also conceivable. Even their shape, which is described and shown herein throughout as cuboidal or substantially cuboidal, is not limited thereto, but almost any shape can be used as long as a connecting element can be provided, although the cuboidal shape is preferred with respect to flexible combination possibilities and a resulting compact arrangement. Flexible combination possibilities in connection with the cuboid shape arise in particular when the side surface dimensions of the cuboids to be combined are each integer multiples of one another, i.e., for example, the width of the cuboid is twice its height, and also the different components have side surface dimensions which are either equal to or integer multiples of one another.

In the following, the connecting mechanism 50 is described with reference to FIGS. 8 to 16 using the example of a set 100 of lighting components comprising two blinders 10, 11. The blinder 10 corresponds to the first lighting component and the blinder 11 to the second lighting component.

Figure 8:
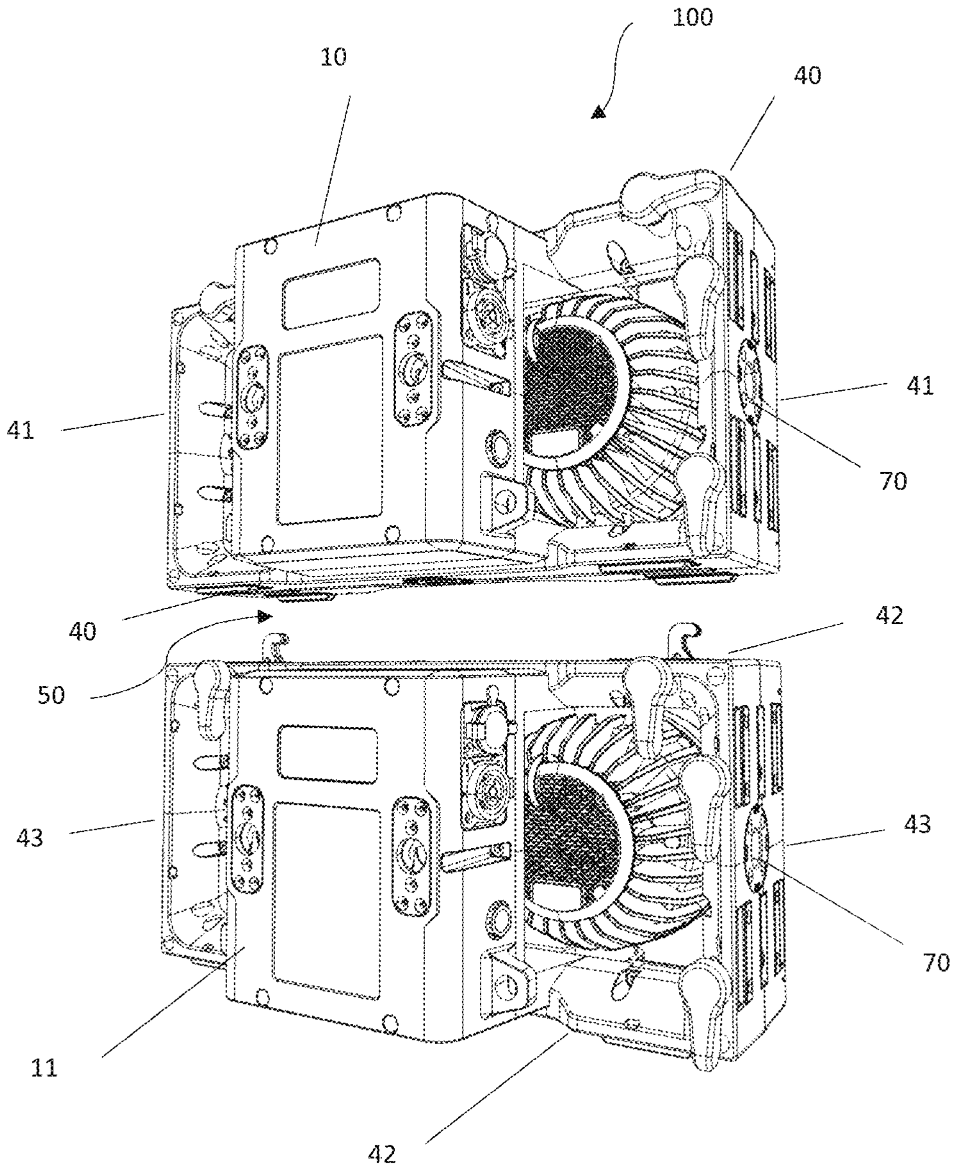
FIG. 8 shows a set of lighting components according to a further embodiment, wherein the lighting components are shown in a separated state from each other.

FIG. 8 shows the blinders 10, 11 in their separated state in a perspective view from the rear, i.e. from the side opposite the light output. The blinders 10, 11 are both of identical construction and are substantially cuboidal in shape. Substantially cuboidal includes shapes such as that shown here in FIG. 8, in which, for example, a protruding housing part is provided at the rear, behind which electronic components, control components, etc. can be provided. Each of the blinders 10, 11 has four substantially rectangular side faces 40, 41 and 42, 43 respectively, the side faces 40, 42 being the side faces located along the longitudinal extent of the cuboid and the side faces 41, 43 being the side faces perpendicular thereto, i.e. the relatively short side faces. For each cuboid, two side faces are of equal dimensions. In the following, for descriptive purposes, the left-right direction in FIG. 8 is referred to as the length of the cuboid and the top-down direction in FIG. 8 is referred to as the height of the cuboid. The length of the cuboid of the blinders 10, 11 is double (twice) of the height of the cuboids of the blinders 10, 11.

On each of the side surfaces 40, 41, 42, 43 of the blinders 10, 11, a mounting socket 70 is provided centrally, at the area center, to which additional elements, such as a bracket 15 (shown in FIGS. 1 to 6), which serves as a handle bracket, as a mounting bracket and/or as a retaining bracket, can be attached. To this end, the mounting socket 70 is configured to lock a bracket 15 or similar transport or mounting component for attaching the set 100 to an external support, by means of a bayonet lock or closure, for example. Preferably, the mounting socket 70 is provided with four positions each offset by 90 degrees with respect to each other, in which connections of a bracket 15 can be inserted into the mounting socket 70 and then the bracket 15 can be locked in the mounting socket 70, for example by rotating it by 45 degrees, i.e. four mounting positions offset by 90 degrees with respect to each other are possible. Thus, a bracket 15, for example a handle bracket, a mounting bracket or a retaining bracket, or a corresponding transport or attachment component can be attached flexibly and as required depending on the orientation of the blinders 10, 11.

Alternatively, instead of providing a separate mounting socket 70, a bracket 15 or the like could also be attached to the set 100 of lighting components by means of the connecting mechanism 50, as shown in FIG. 7 in conjunction with the sledge 16.

In the embodiment shown in FIGS. 8 to 16 and described below, all four side faces of each blinder 10, 11 are of identical configuration with regard to the provision of the mounting socket 70 and the connecting mechanism 50. Alternatively, mounting sockets 70 and/or connecting mechanisms 50 could also be provided on only a part of the side surfaces of the blinders 10, 11, e.g. only on one side surface in each case.

In the following, the connecting mechanism 50 between the blinders 10, 11 is described by means of the connecting mechanism 50 attached to the side surfaces 40, 42.

Each blinder 10, 11 has a housing 30, 31 for covering. In FIGS. 11 to 15, the housing 30, 31 is omitted in each case for illustration of the connecting mechanism 50.

On the side surface 40 of the blinder 10, which corresponds to the first connection surface of the first lighting component, openings 33 or recesses are provided in the housing which allow the first connection elements 52 of the connecting mechanism 50 to pass through them and to engage with the second connection elements 54 of the connecting mechanism 50. According to the shown embodiment, two openings 33 are provided on each side surface 40 in a central position in the depth direction of the side surface 40 and axially symmetrical with respect to a central axis in the longitudinal direction. Inside the housing 30 of the blinder 10, bolts 54 are arranged as second connection elements.

Likewise, corresponding openings 33 are provided at identical positions in the housing 31 on the side surface 42 of the blinder 11 corresponding to the first connecting surface of the second lighting component. The hook elements 52 attached to the blinder 11 as first connection elements can be rotated out through these openings 33 by means of a corresponding rotation mechanism or, when not in use, can be rotated back into the housing 31.

Figure 9:
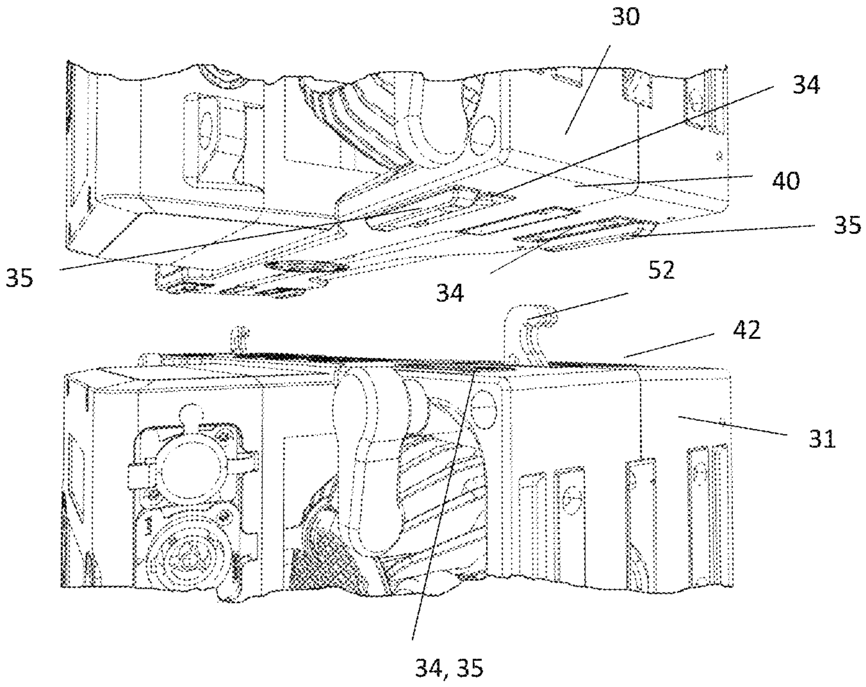
FIG. 9 is a detailed view of the connecting surfaces of the set of lighting components of FIG. 8.

As can be seen in FIG. 9, the side surfaces 40, 42 of the blinders additionally have guiding or positioning elements adapted to bring two lighting components into alignment with each other in a simpler and more stable manner. In the illustrated embodiment, the guiding and positioning elements are formed by elongated, rail-like guide projections 35 and corresponding guide grooves 34, so that one blinder 10 may be slid onto the other blinder 11 in the longitudinal direction of the blinder 10. In addition, flat, strong magnets are provided in the guide grooves 34, which form a magnetic connection with corresponding reverse-poled magnets in the area of the guide projections. The magnets can be used as required without interlocking positive guidance and positioning elements, i.e. shown grooves and projections, as guiding and positioning elements, or alternatively only positive interlocking elements can be used as guiding and positioning elements without magnets. Magnets have the advantage that, for example, further components can be preassembled from below by means of the attraction force of the magnets before a lock is operated.

If required, additional stops (stop elements) can be provided to facilitate positioning.

Instead of the shown guiding grooves 34 and guiding projections 35, the guiding and positioning elements can be configured exclusively as magnets or also in other forms. Furthermore, guiding and positioning elements can be provided on both connecting surfaces 40, 42, e.g. as guiding grooves and guiding projections, or alternatively a guiding projection can be provided on one connection surface and only a guiding groove on the other, i.e. each connection surface 40, 42 has only one of the mutually complementary guiding and positioning elements, e.g. in the case of magnets only a north or a south pole magnet.

Figure 10:
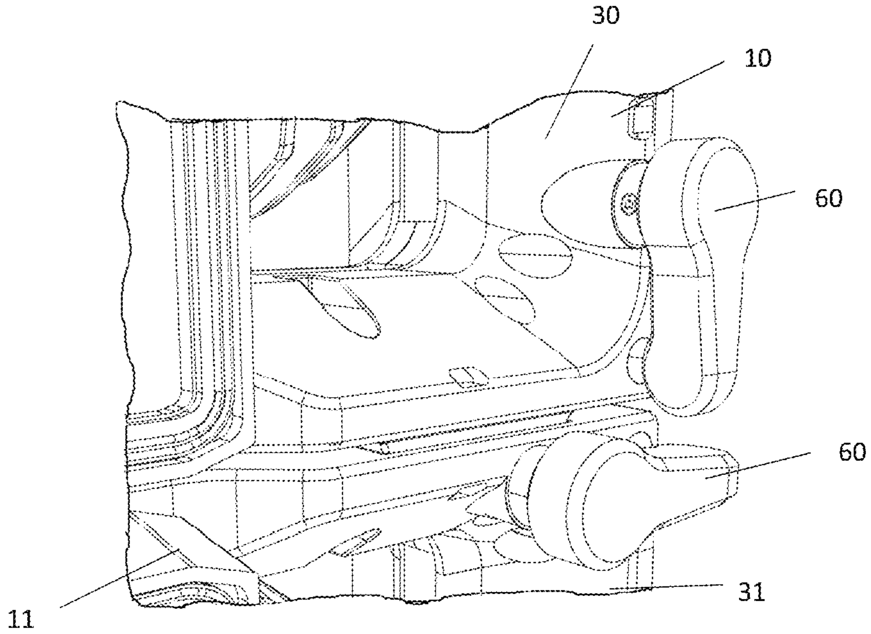
FIG. 10 is a detail view of the connecting mechanism of the set of lighting components shown in FIG. 8 as a cutaway, wherein a housing is provided on the lighting components.
Figure 11:
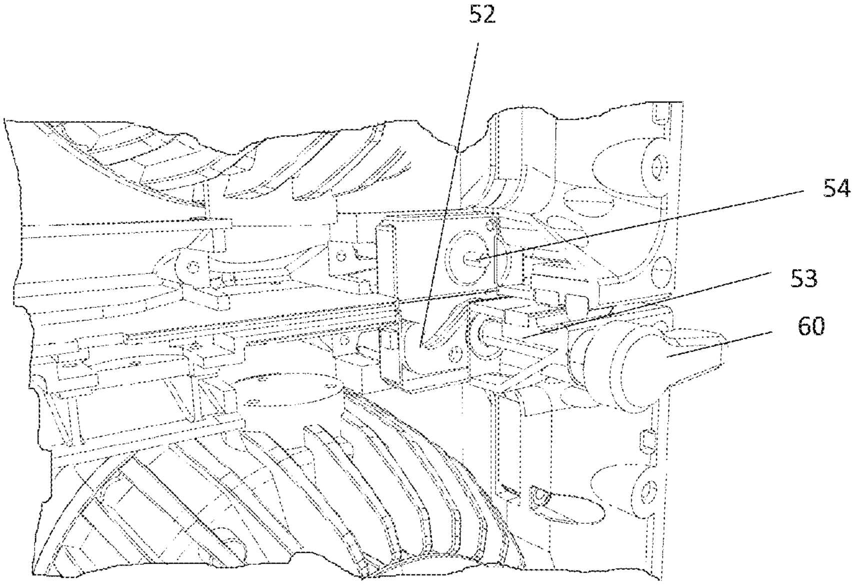
FIG. 11 is a detail view corresponding to FIG. 10, wherein the housing is removed and the connecting mechanism is in a first position.
Figure 12:
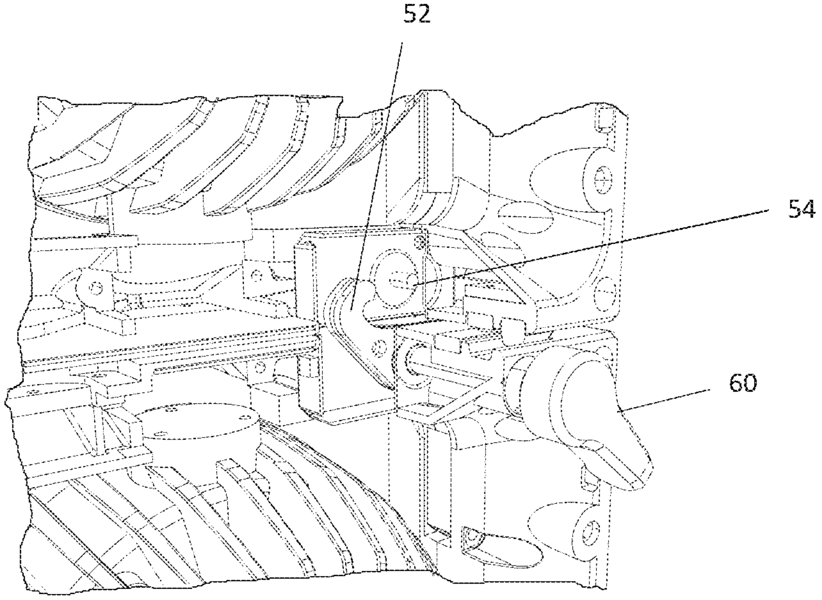
FIG. 12 is a detailed view corresponding to FIG. 11, with the connecting mechanism in a second position.
Figure 13:
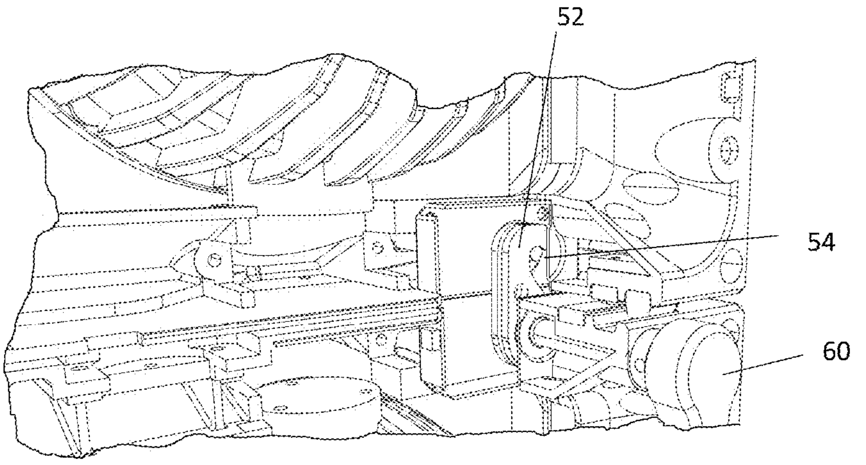
FIG. 13 is a detailed view corresponding to FIG. 11, with the connecting mechanism in a second position.
Figure 14:
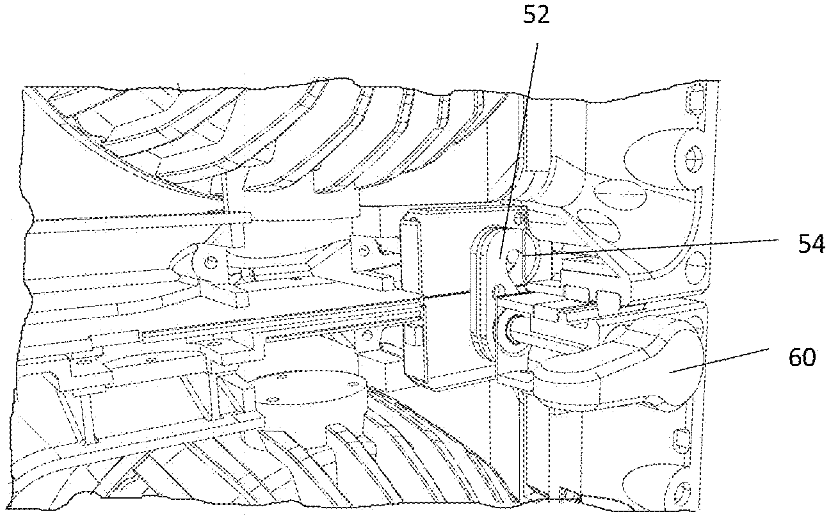
FIG. 14 is a detailed view corresponding to FIG. 11, wherein the connecting mechanism is in a second position.
Figure 15:
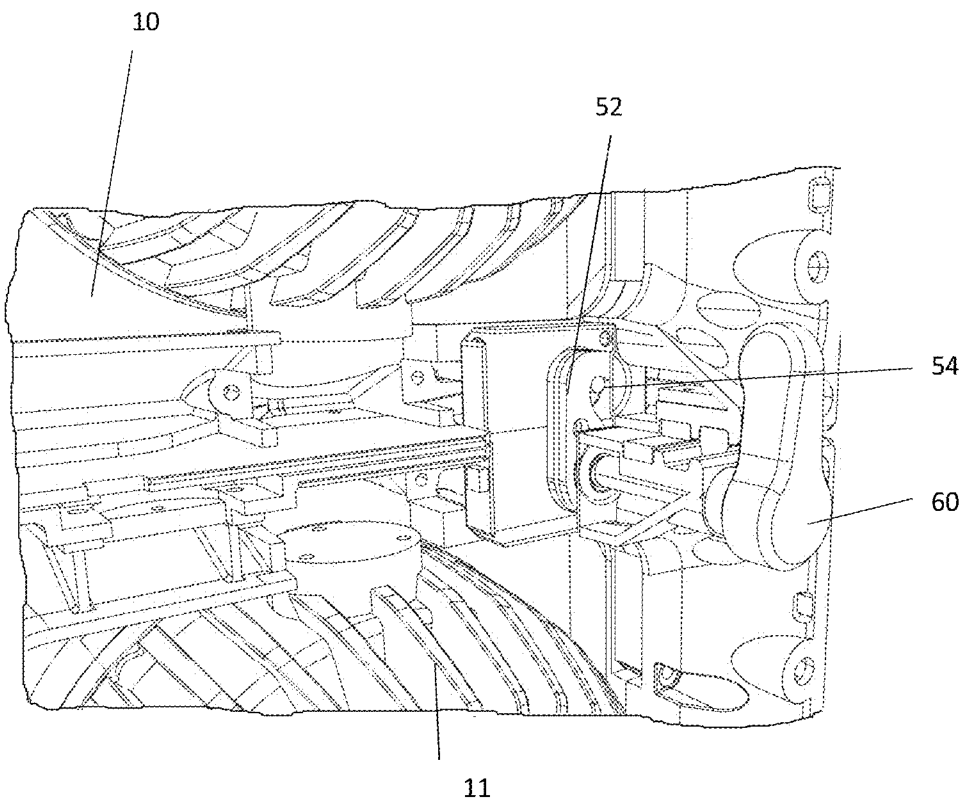
FIG. 15 is a detailed view according to FIG. 11, wherein the connecting mechanism is in a second position.
Figure 16:
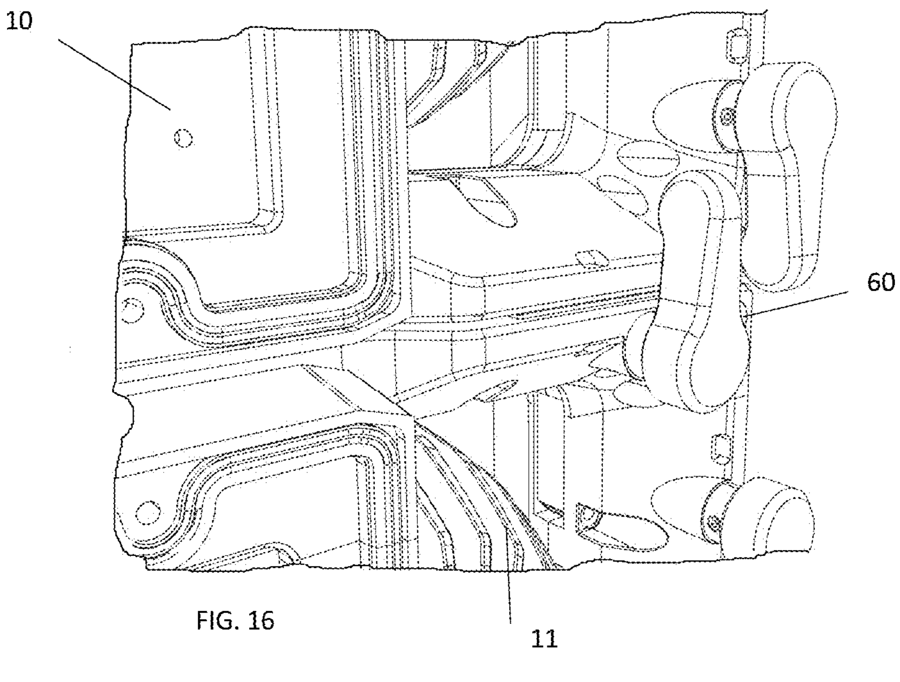
FIG. 16 is a detailed view corresponding to FIG. 11, wherein the connecting mechanism is in a second position.

To operate the connecting mechanism 50, rotary handles 60 are provided for moving the hook elements 52 in each case. One rotary handle is provided for each connection surface and associated connection element (hook element 52) or, if necessary, for several hook elements of the same connection surface together. In FIG. 10, the lower rotary handle 60 is for actuating the hook element 52, which is attached to the connection surface 42 of the blinder 11, the upper rotary handle 60 is for actuating a hook element on the side surface 41 of the blinder 10 perpendicular to the connection surface 42. The mode of operation is correspondingly and explained with reference to FIGS. 11 to 15, where the housings 30, 31 are removed. FIGS. 10 and 16 show the initial and final positions, respectively, of the rotary handle 60 with the housing 30, 31 in place.

A locking (not shown) may additionally be integrated in the rotating mechanism, which is actuated by the rotary handles 60, which presses the rotary handle into a locked position e.g. by spring action, so that the rotary handle 60 can only be actuated in case of pressure or pull against the biasing effect of such a spring and is otherwise locked, e.g. by a positive lock.

If two lighting components 10, 11 are to be connected to each other, the lighting components 10, 11 are first placed with their connecting surfaces 40, 42 lying one above the other by means of the guiding grooves 34 and guiding projections 35, as shown in FIG. 10.

Then, as shown in FIGS. 11 to 15, the rotary handle 60 on the blinder 11 is rotated clockwise, if necessary after it has been released from its locking position. This rotation of the rotary handle 60 is transmitted to the hook element 52 of the blinder 11 by means of the axle 53, so that the latter and the axle 53 rotate together. When the rotation is sufficient (FIGS. 13 to 15), the hook element finally engages the pin 54 provided on the blinder 10 and hooks with it. Thereby, the blinder 10 and the blinder 11 are connected to each other. Finally, in the final position shown in FIG. 15 and FIG. 16, the rotary element 60 is brought into a locked position, if necessary (by, for example, the action of a spring not shown). The connected, locked position is shown in FIG. 16 with attached housings 30, 31.

Since corresponding connecting mechanisms 50 and connecting surfaces 40, 41, 42, 43 are provided on all side surfaces of the cuboid shaped lighting components and matched to one another in size, as well as the connecting elements 50, 52 of the connecting mechanisms are matched to one another in size and position, it is possible to create arbitrarily continued arrangements (clusters) of lighting components which require only one common fastening or mounting in the room.

Figure 17:
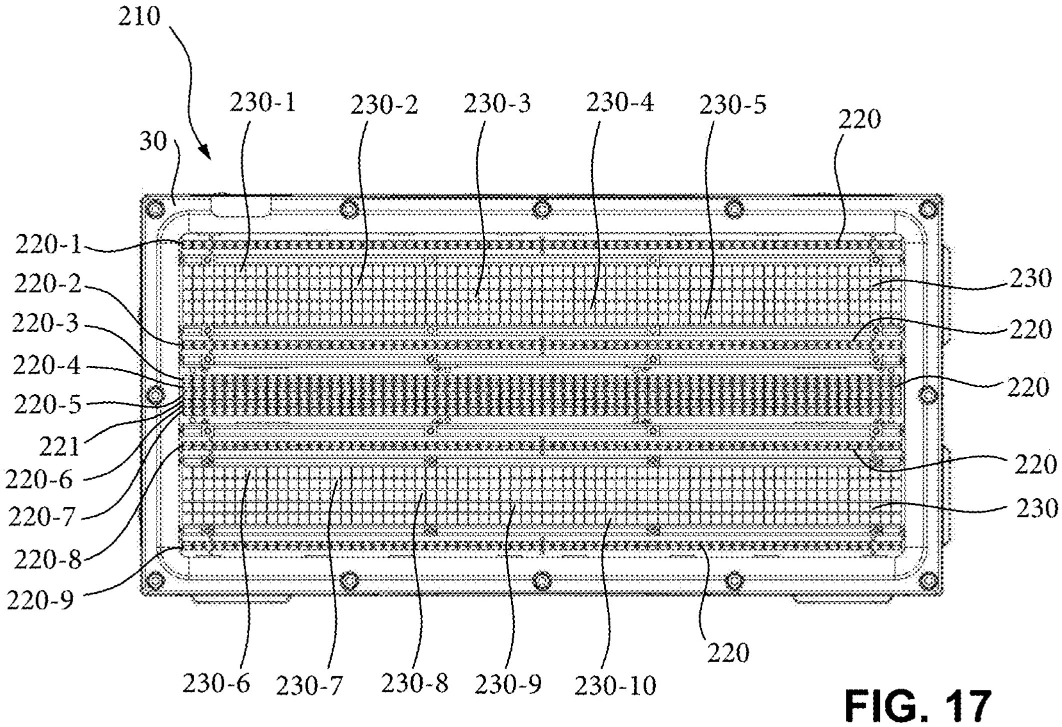
FIG. 17 is a front view showing an embodiment of a lighting device without elliptical lenses.
Figure 18:
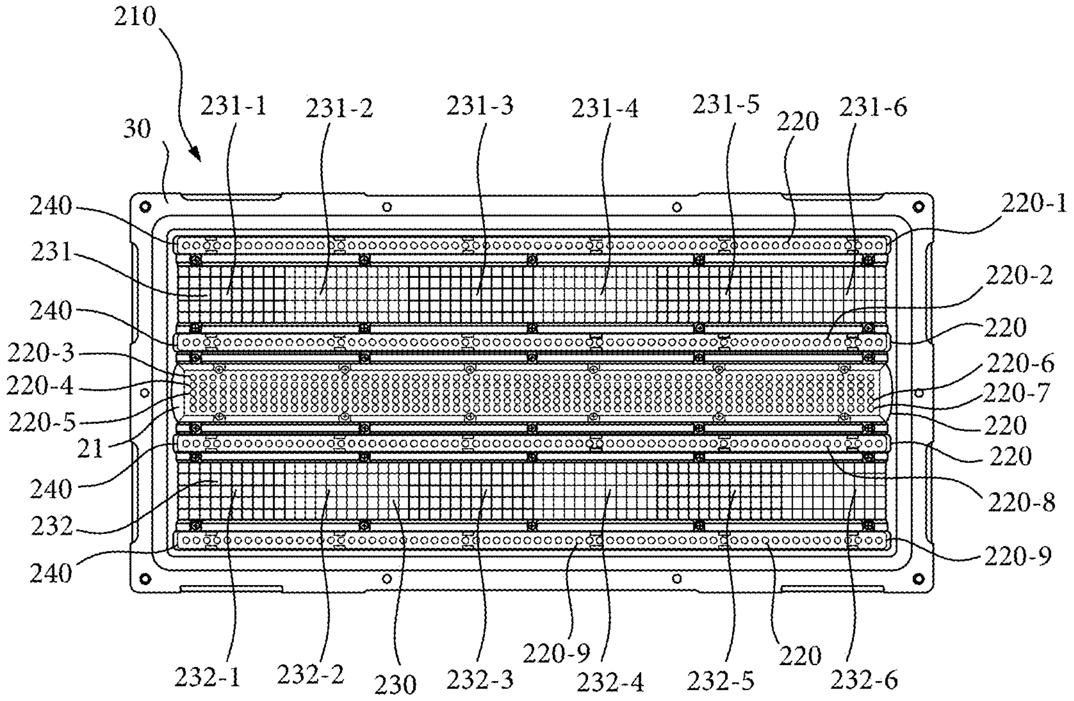
FIG. 18 shows a front view of the lighting device of FIG. 17 with elliptical lenses.
Figure 19:
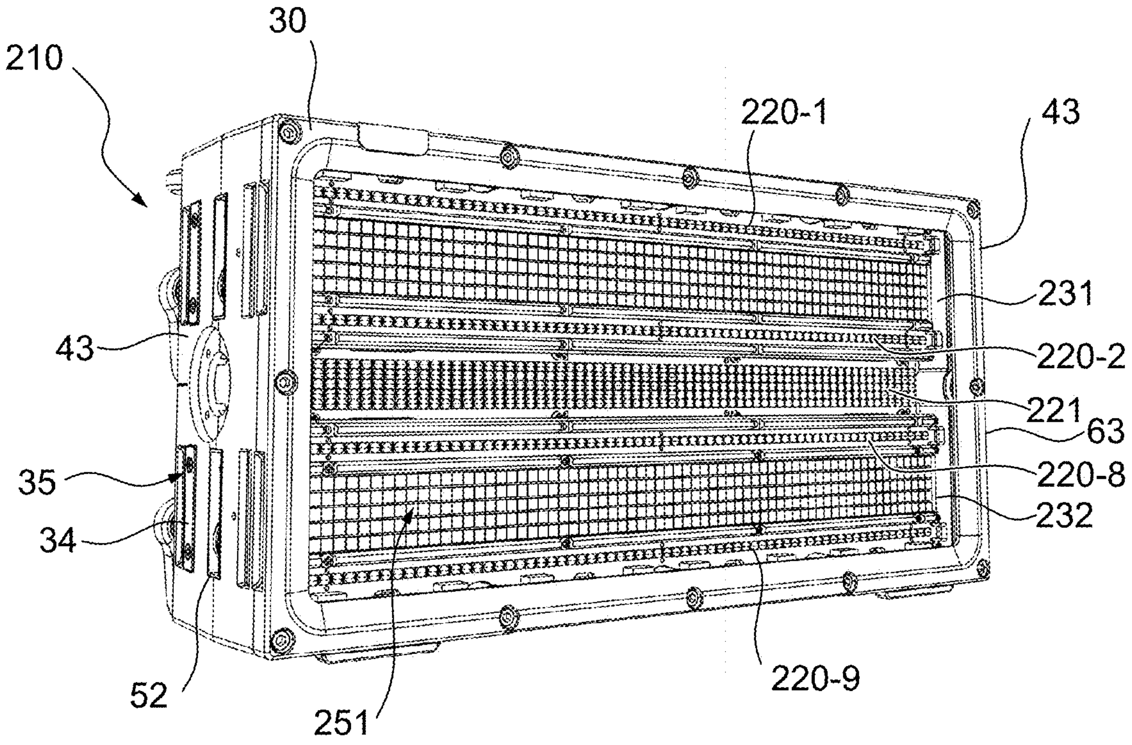
FIG. 19 shows a perspective view of the lighting device of FIG. 17.

Particularly preferably, the set of lighting components (100) comprises two or more lighting devices 210 as described below with reference to FIGS. 17 to 22:

FIGS. 17 and 18 show a front view and FIG. 19 shows a perspective view of an embodiment of a lighting device 210, which may be configured as described above with respect to the connection to neighboring lighting devices 210, but can in principle also be used alone, outside the set 100. A plurality of lighting elements 220, 230 is arranged on a substantially rectangular surface 251 of the lighting device 210.

The lighting elements 220, 230 are formed by LEDs (light-emitting diodes) and can all be arranged on a single, common circuit board, or on several separate circuit boards (not shown).

As can best be seen from FIGS. 17 and 18, the lighting elements 220, 230 of the lighting device 210 are arranged in rows 220-1 to 220-9 and 230-1 to 230-10, respectively, which are parallel to the longitudinal edge of the lighting device 210. In particular, nine rows 220-1 to 220-9 of first lighting elements 220 are provided and ten rows 230-1 to 230-10 of second lighting elements 230 are provided. Each row comprises, for example, 68 lighting elements 220, 230 formed as LEDs, wherein the first lighting elements 220 are formed as CW (cold-white) LEDs and the second lighting elements 230 are formed as RGB LEDs.

The rows 220-1 to 220-9 or 230-1 to 230-10 are arranged symmetrically in the direction perpendicular to the direction of a row on the corresponding surface 251. In particular, according to the shown embodiment, the row 220-5 of first lighting elements 220 corresponds to the symmetry axis of the arrangement.

Of the nine rows of first lighting elements 220, five rows 220-3, 220-4, 220-5, 220-6 and 220-7 of first lighting elements are arranged centrally in the direction perpendicular to rows 220-1 to 220-9 and directly adjacent to each other, i.e. with a distance between two adjacent rows 220-3 to 220-7 substantially equal to the distance between two adjacent lighting elements 220 of a row. These rows 220-3 to 220-7 form a group 221 of first lighting elements 220. In the illustrated embodiment, this group 221 of first lighting elements 220 is formed on a common carrier and can only be controlled together. I.e. this group 221 of first lighting elements 220 is formed as a unit and is not controllable as individual rows. Alternatively, several, e.g. five, in principle separately from each other, but also together, controllable rows of first lighting elements could be accordingly arranged as a group and closely spaced.

Four rows 220-1, 220-2, 220-8, 220-9 of first lighting elements 220 are arranged as individual rows, i.e. on both sides their distance to an adjacent row of first lighting elements 220 is significantly greater than the distance between two lighting elements 220 of a row and/or they are adjacent to rows of second lighting elements 230 and/or they are positioned as at the edge of the overall arrangement. For example, rows 220-1 and 220-9 are positioned at the edge and are each adjacent to rows 230-1 and 230-10 of second lighting elements, respectively, on their other side. Rows 220-2 and 220-8 of first lighting elements are adjacent to rows 230-5 and 230-6 of second lighting elements, respectively, on one side and are significantly spaced from rows 220-3 and 220-7 of first lighting elements, respectively, on the other side.

The second lighting elements 230 are arranged in two groups 231, 232 of second lighting elements each having five rows 230-1 to 230-5 and 230-6 to 30-210, i.e., adjacent rows of second lighting elements are the same distance apart as the lighting elements 230 of the row are from each other.

Overall, as viewed from an edge, rows 220-1 to 220-9 and 230-1 to 230-10 of lighting elements 220, 230 are arranged as follows: a single row 220-1 of first lighting elements, a group 231 of five rows 230-1 to 230-5 of second lighting elements, a single row 220-2 of first lighting elements, the central group 221 of first lighting elements comprising five rows 220-3 to 220-7 of first lighting elements 220 which can only be controlled together, a single row 220-8 of first lighting elements, a group 232 of five rows 230-6 to 230-10 of second lighting elements, and a single row 220-9 of first lighting elements. In each case, the spacing of the single rows 220-1 and 220-2 of first lighting elements, the spacing of the single rows 220-2 and 220-8 of first lighting elements, and the spacing of the single rows 220-8 and 220-9 of first lighting elements are identically selected. The distance of the rows 220-1 and 220-9 of first lighting elements from the edge of the lighting device 210 is half the distance of the individual rows 220-2 and 220-8 of first lighting elements, for example. This serves to ensure that when two lighting devices 210 are combined, the distance from an outer row 220-1 of one lighting device 210 to the outer row 220-9 of the other lighting device 210 is the same as, for example, the distance between the individual rows 220-2 and 220-8 of first lighting elements of a single lighting device 210, and thus multiple lighting devices 210 can be seamlessly combined even in the direction perpendicular to the direction of the rows of first lighting elements.

As shown in FIG. 18, the individual rows 220-1, 220-2, 220-8, 2220-9 of first lighting elements and the central group 221 of rows 220-3 to 220-7 of first lighting elements are each covered with an elliptical lens 240, 245 to imitate the traditional appearance of Xenon tubes.

FIG. 18 also schematically shows that the groups 231, 232 of second lighting elements are each divided into six segments 231-1 to 231-6 and 232-1 to 232-6, which can be individually controlled by a controller (not shown). Correspondingly (not shown), the individual rows 220-1, 220-2, 220-8 and 220-9 of first lighting elements are each divided into twelve segments along their longitudinal direction, each segment also being individually controllable. The central group 221 of first lighting elements 220 with rows 220-3 to 220-7 is not subdivided into individual segments. This means that this central group can only be controlled together along its longitudinal direction and at the same time can only be controlled as a common block, i.e. over all five rows.

Figure 20:
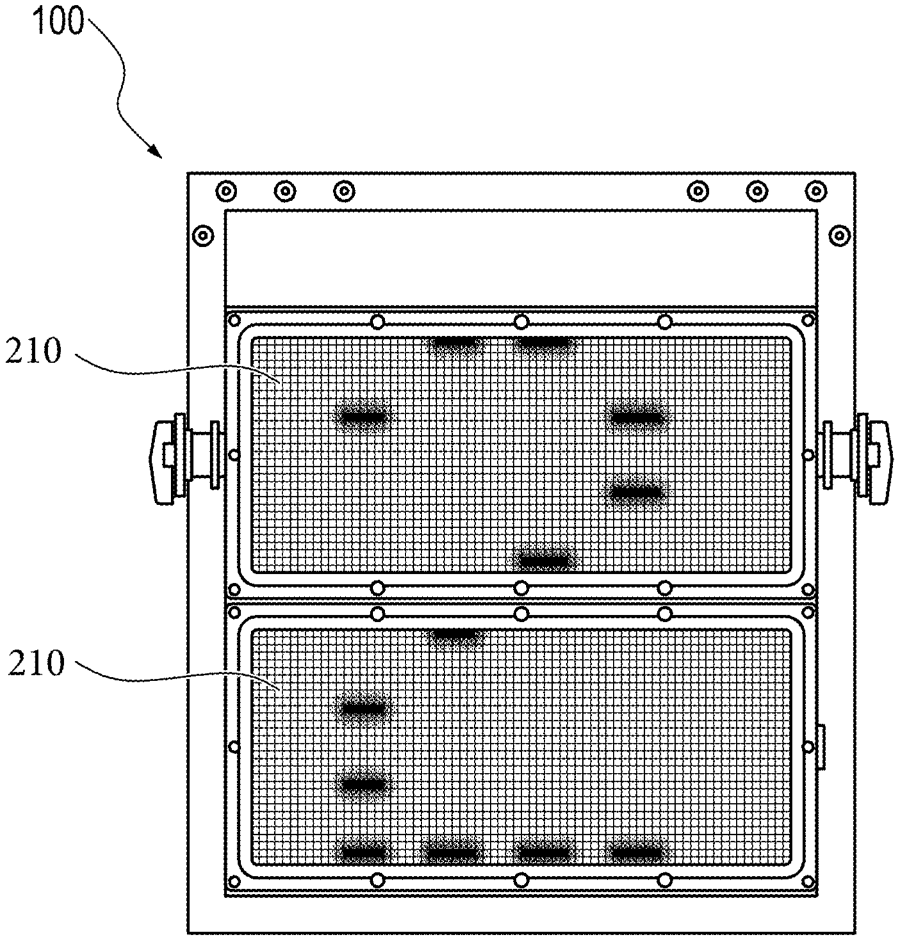
FIG. 20 shows an example of a graphic obtainable with a set of two lighting devices as shown in FIG. 17.
Figure 21:
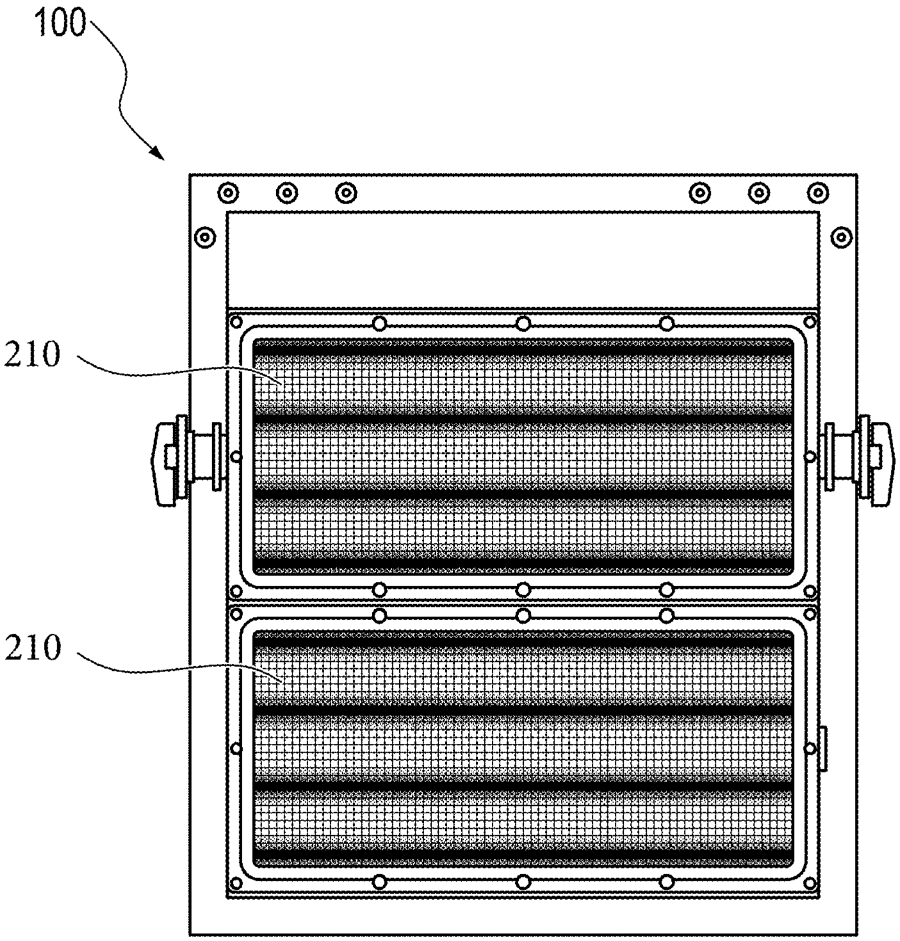
FIG. 21 shows another example of a graphic obtainable with a set of two lighting devices according to FIG. 17.
Figure 22:
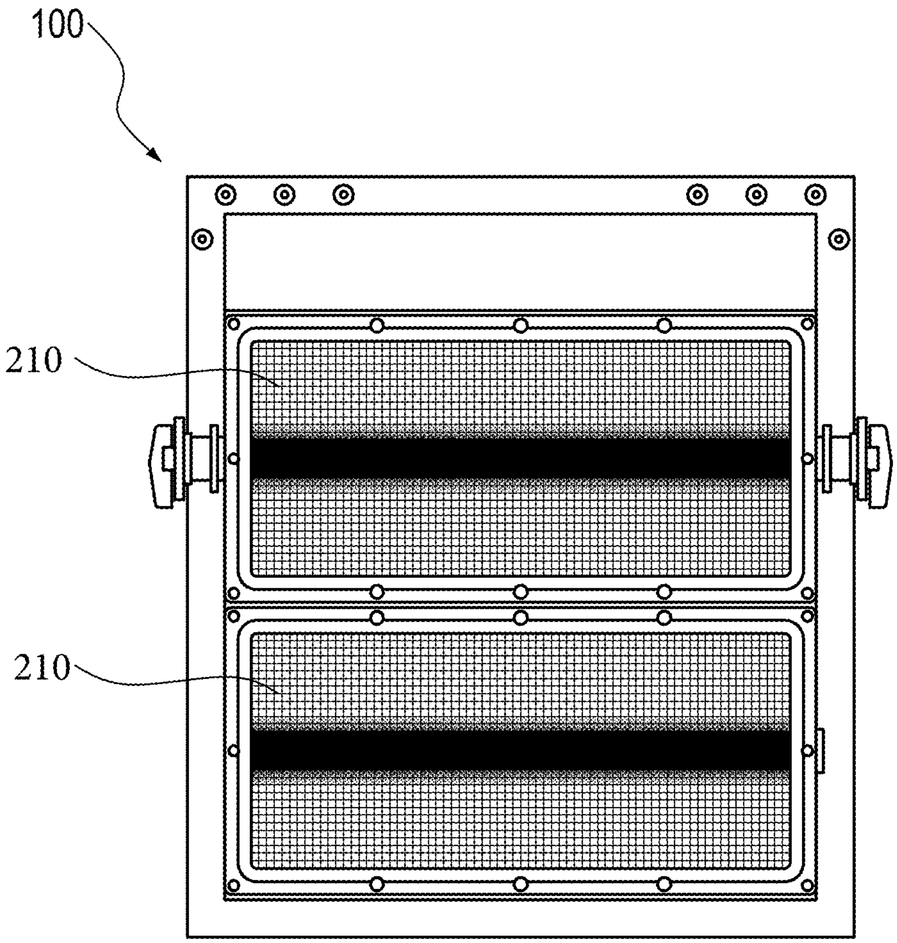
FIG. 22 shows an example of a strobe graphic obtainable with a set of two lighting devices according to FIG. 17.

FIGS. 20 to 22 respectively show lighting configurations that can be realized with a set 100 of two lighting devices 210 of the type described, which are interconnected.

FIG. 20 shows a configuration in which the number “2” is modelled by driving and illuminating individual segments of rows 220-1, 220-2, 220-8, and 220-9 of the two lighting devices 210, i.e., segments of each of the four individual rows 220-1, 220-2, 220-8, and 220-9 of first lighting elements.

FIG. 21 shows a configuration in which all segments of the rows 220-1, 220-2, 220-8 and 220-9 of the two lighting devices 210, i.e. all segments of the four individual rows 220-1, 220-2, 220-8 and 220-9 of first lighting elements, are controlled and illuminated to produce a continuous line pattern even across several lighting devices 210.

Finally, FIG. 22 shows a configuration in which, by controlling and lighting the group 221 of first lighting elements with the rows 220-3 to 220-7 of the two lighting devices 210, wherein the respective groups 221 of the two lighting devices 210 according to the shown embodiment can each be controlled exclusively together and not segment by segment, a continuous stroke pattern of two stroboscopic light flashes is realized overall, even across several lighting devices 210.

Corresponding patterns can also be achieved by means of the rows of second lighting elements 230-1 to 230-10.

Thus, when using lighting devices 210 in a set 100, stroboscopic effects can be achieved as well as white and colored light patterns. Due to the equal distance of the individual LED lines to each other, continuous effects can be displayed over several devices. In this way, the devices merge into a big picture in both horizontal and vertical orientation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A set of lighting components, comprising a first lighting component with a first connecting surface of the first lighting component and a second lighting component with a first connecting surface of the second lighting component, wherein a first connecting element of a connecting mechanism is provided at the first connecting surface of the first lighting component and a second connecting element of the first connecting mechanism is provided at the first connecting surface of the second lighting component, which is complementary to the first connecting element, so that the first lighting component is configured to be detachably connected to the second lighting component by detachably connecting the first connecting element to the second connecting element, and the first lighting component and the second lighting component is configured to be fastened and locked to each other, wherein the connecting elements of the connecting mechanism are matched to one another in size and position such that it is possible to create arbitrarily continued arrangements (clusters) of lighting components which require only one common fastening or mounting in the room, and wherein a first element of a guiding and positioning mechanism for pre-positioning and pre-connecting the first and second lighting components is provided on the first connecting surface and a second element of the guiding and positioning mechanism is provided on the second connecting surface in alignment with the first element, wherein the pre-connection is so reliable and strong that during assembly and disassembly the lighting components are held together without further fastening means.

2. A lighting device for use as a lighting component in a set according to claim 1, the lighting device comprising a plurality of first lighting elements adapted to emit light in a fixed first light spectrum and a plurality of second lighting elements adapted to emit light in a variable light spectrum, wherein the first lighting elements and the second lighting elements are each arranged in at least two rows of first lighting elements and at least two rows of second lighting elements, wherein at least a part of the rows of first lighting elements is arranged as a single row, and wherein the lighting elements are LEDs.

3. The lighting device according to claim 2, wherein the fixed first light spectrum is white, or the variable light spectrum is an RGB light spectrum.

4. The lighting device according to claim 2, wherein the rows of first lighting elements arranged as a single row are each covered with an elliptical lens.

5. The lighting device according to claim 2, wherein a plurality of single rows of first lighting elements are provided, or wherein at least three rows of first lighting elements are provided, and a part of the rows of first lighting elements form a group of first lighting elements comprising at least two directly adjacent rows of first lighting elements, wherein the group is covered with an elliptical lens, or wherein the group of rows of first lighting elements is arranged in a central area of the lighting device, in a direction perpendicular to the row.

6. The lighting device according to claim 2, wherein at least a part of the rows of second lighting elements is grouped into a group of second lighting elements comprising at least two directly adjacent rows of second lighting elements.

7. The set according to claim 1, wherein the first connecting surface of the first lighting component and the first connecting surface of the second lighting component are complementarily shaped.

8. The set according to claim 1, wherein the first lighting component further comprises the second connecting surface at which the second connecting element of the connecting mechanism is provided, wherein the second connecting surface of the first lighting component is opposite to the first connecting surface of the first lighting component.

9. The set according to claim 1, wherein the second lighting component further comprises the second connecting surface at which a first connecting element of the connecting mechanism is provided, wherein the second connecting surface of the second lighting component is opposite to the first connecting surface of the second lighting component.

10. The set according to claim 1, wherein on the first connecting surface or on the second connecting surface both a first element of a connecting mechanism and a second element of a connecting mechanism are provided.

11. The set according to claim 1, wherein the first lighting component and the second lighting component are cuboid, and on all four side faces of at least one of the first and second lighting components a first connecting element and a second connecting element is provided, respectively, wherein one of the first and second connecting elements is a hook member and the other of the first and second connecting elements is a bolt member.

12. The set according to claim 1, wherein the first connecting element or the second connecting element is provided as a member protruding from the connecting surface and having a shape capable of interlocking with the shape of the other of the first connecting element or the second connecting element, which is recessed from the connecting surface.

13. The set according to claim 1, wherein the first connecting element or the second connecting element is configured to be brought into the position protruding with respect to the connecting surface by a rotating mechanism.

14. The set according to claim 1, wherein the first element and the second element of the guiding and positioning mechanism for pre-positioning and pre-connecting the first and second lighting components additionally provided at the connecting surfaces are magnetic elements.

15. The set according to claim 1, wherein the first or the second lighting component is a blinder, a spotlight, a floodlight, a strobe, an area light, an area spotlight or a couplable speaker.

16. A set of lighting components, comprising:

a first lighting component having a first housing, the first housing having a connecting surface in a depth direction of the first lighting component;

a second lighting component having a second housing, the second housing having a complementary connecting surface in the depth direction of the second lighting component;

a connecting mechanism between the connecting surface of the first lighting component and the complementary connecting surface of the second lighting component, the connection mechanism comprising:

a first connecting element inside the first housing; and a second connecting element inside the second housing which is complementary to the first connecting element, so that the first lighting component is capable of being detachably connected to the second lighting component by detachably connecting the first connecting element to the second connecting element, and the first lighting component and the second lighting component is capable of being fastened and locked to each other, wherein the connecting elements of the connecting mechanism are matched to one another in size and position such that it is possible to create arbitrarily continued arrangements (clusters) of lighting components which require only one common fastening or mounting in the room, and a first element of a guiding and positioning mechanism for pre-positioning and pre-connecting the first and second lighting components on the connecting surface of the first housing and a second element of the guiding and positioning mechanism is provided on the complementary connecting surface of the second housing in alignment with the first element, wherein the pre-connection is so reliable and strong that during assembly and disassembly the lighting components are held together without further fastening means.

* * * * *